United States Patent [19]
Everitt

[11] Patent Number: 5,596,176
[45] Date of Patent: Jan. 21, 1997

[54] CABLE SEALING ARRANGEMENTS

[75] Inventor: Christopher H. Everitt, Bedfordshire, England

[73] Assignee: Framatome Connectors International, Paris, France

[21] Appl. No.: 335,339

[22] Filed: Nov. 3, 1994

[30] Foreign Application Priority Data

Nov. 3, 1993 [GB] United Kingdom .............. 9332662

[51] Int. Cl.⁶ .......................... H02G 3/22; H02G 3/08
[52] U.S. Cl. ........................................ 174/151; 439/936
[58] Field of Search ..................... 174/151, 65 G, 174/65 SS, 152 G, 153 G; 439/521, 936; 16/2

[56] References Cited

U.S. PATENT DOCUMENTS

| | | | |
|---|---|---|---|
| 2,813,692 | 11/1957 | Bremer et al. | |
| 2,820,088 | 1/1958 | Sperry | 174/153 G |
| 4,103,911 | 8/1978 | Giebel et al. | 174/77 R X |
| 4,249,353 | 2/1981 | Berry | 174/151 X |
| 4,460,227 | 7/1984 | Ball . | |
| 4,662,692 | 5/1987 | Uken et al. | |
| 4,734,057 | 3/1988 | Noschese . | |
| 4,927,336 | 5/1990 | Neuroth . | |
| 4,932,875 | 6/1990 | Ogawaw et al. | |
| 5,066,242 | 11/1991 | Martucci . | |
| 5,442,140 | 8/1995 | McGrane | 174/151 |

FOREIGN PATENT DOCUMENTS

| | | |
|---|---|---|
| 049942 | 4/1982 | European Pat. Off. . |
| 335721 | 10/1989 | European Pat. Off. . |
| 1540647 | 8/1968 | France . |
| 2126194 | 10/1972 | France . |
| 2304195 | 11/1977 | France . |
| 2407579 | 10/1984 | France . |
| 2602374 | 2/1988 | France . |
| 1490607 | 1/1970 | Germany . |
| 723165 | 2/1955 | United Kingdom . |
| 1154929 | 6/1969 | United Kingdom . |
| 1388916 | 2/1971 | United Kingdom . |
| 1524684 | 9/1978 | United Kingdom . |
| 2104311 | 3/1983 | United Kingdom . |
| 2104736 | 3/1983 | United Kingdom . |
| 2168548 | 6/1986 | United Kingdom . |
| 2189660 | 10/1987 | United Kingdom . |

*Primary Examiner*—Kristine L. Kincaid
*Assistant Examiner*—Paramita Ghosh
*Attorney, Agent, or Firm*—Pollock, Vande Sande & Priddy

[57] ABSTRACT

A cable sealing gland includes a housing adapted to be fitted in an opening in a bulkhead and defining a receptacle closed at one end by a silicone rubber membrane backed by a rigid plastic material support insulator which is apertured to permit the passage therethrough of electrical cables or the like which are pierced through the membrane. A second support insulator is spaced apart from the first-mentioned support insulator and the space between the two support insulators is filled with a silicone rubber sealing composition. A by-pass tube extends through the two support insulators and enables access to be obtained through the gland even after it has been sealed.

17 Claims, 8 Drawing Sheets

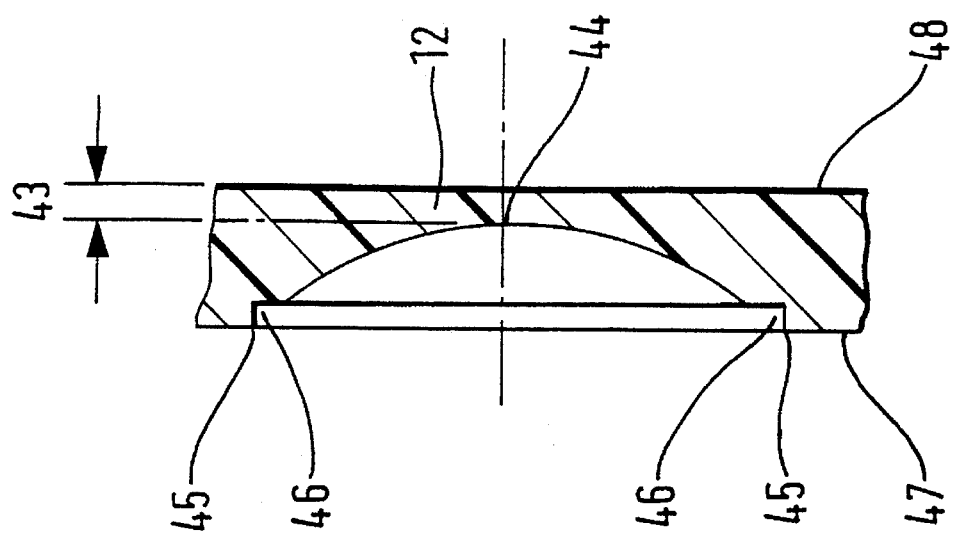
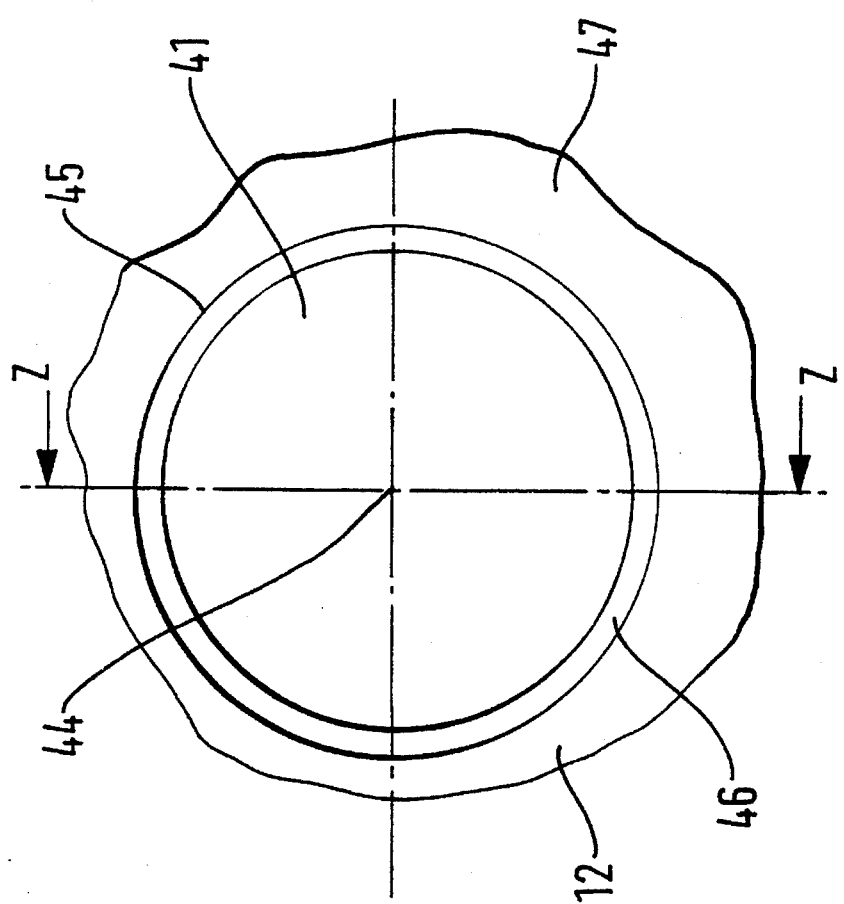
FIG. 3D
FIG. 3C

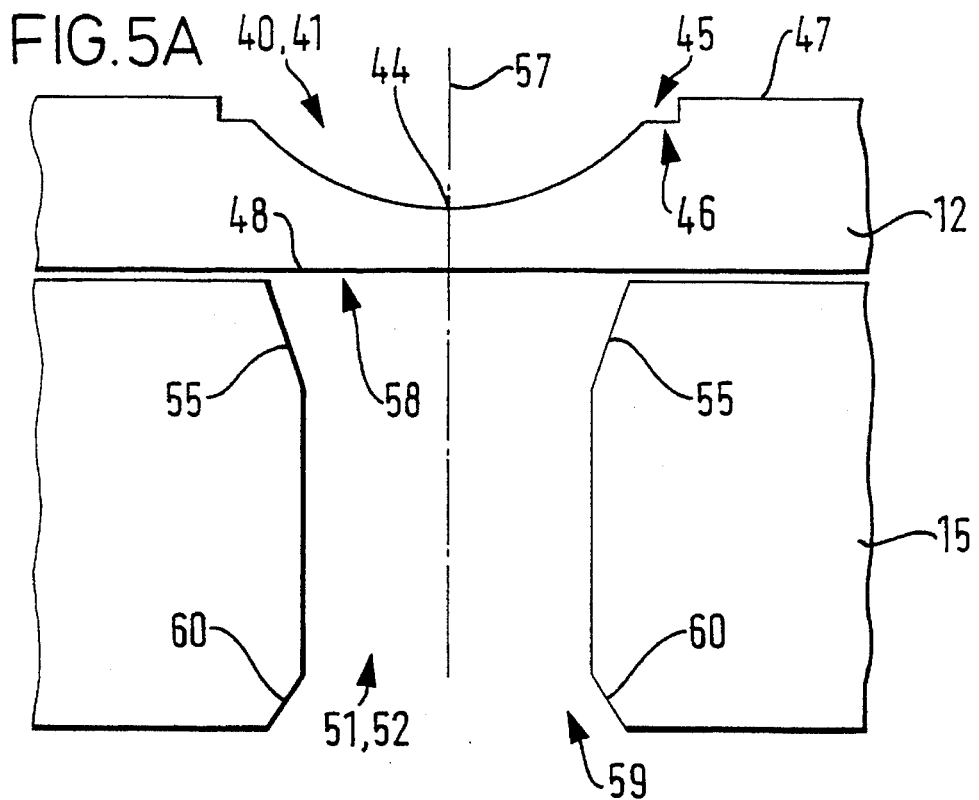
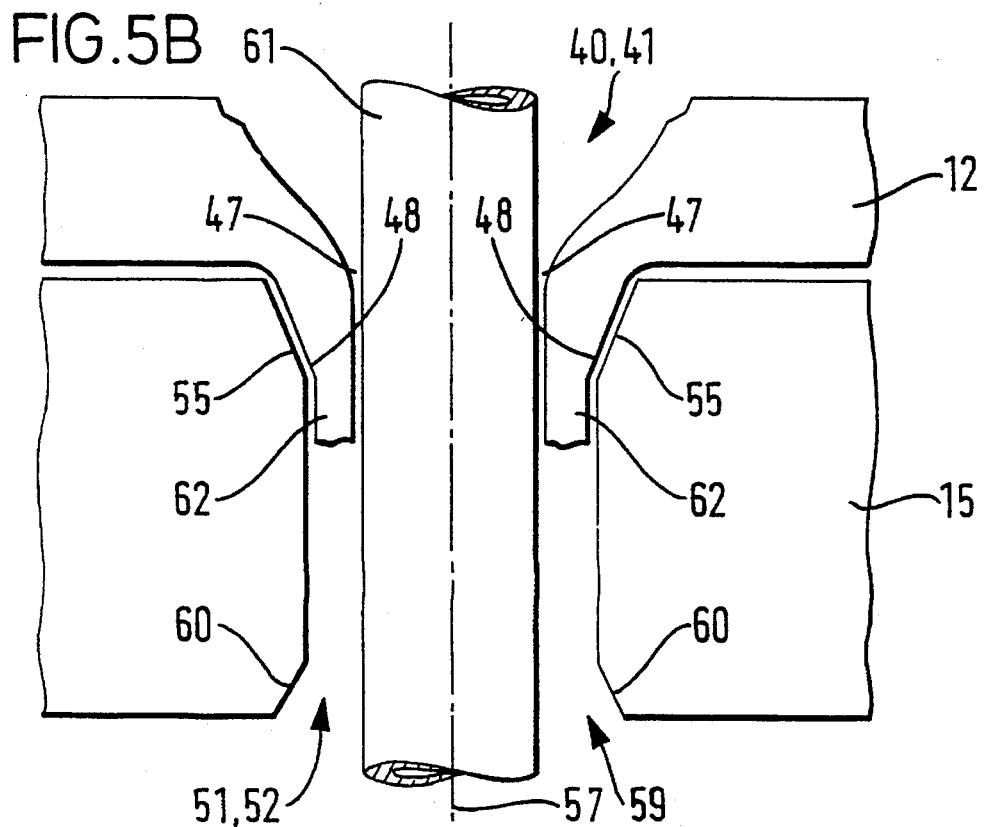

CABLE SEALING ARRANGEMENTS

FIELD OF THE INVENTION

This invention concerns improvements relating to cable sealing arrangements and more particularly, though not exclusively, concerns cable sealing glands for sealing the passage of electrical conductors, cables and the like through bulkheads, particularly, though not exclusively, in aircraft.

BACKGROUND OF THE INVENTION

In the field of aircraft manufacture, electrical wiring extends to all parts of the aircraft from the cockpit, and many cables and individual electrical conductors are passed through bulkheads between the aircraft's fuselage and its wings or its tail, the cables and/or conductors being grouped together and passed through orifices formed at selected positions in the bulkheads. In use, the fuselage of an aircraft is commonly pressurized whereas the wings and tail are not, and, in order to maintain this pressure differential, it is necessary to provide appropriate pressure sealing of the orifices.

Conventional cable sealing glands for use in ships and in buildings make use of packing pieces to seal the passage of a relatively small number of cables having a limited range of sizes through bulkheads and the like. However, in an aircraft, and particularly a technologically sophisticated computer controlled "fly by wire" aircraft, the number of cables and electrical conductors that have to be passed through bulkheads is legion, and there are considerable size differences between the thinnest of single-core conductors, which have sub-millimeter diameters, and larger multiple-conductor cables. The use of packing pieces in aircraft applications is thus impractical and the most commonly used sealing method makes use of an elastomeric bung through which the respective cable/conductor bundle is threaded. The bung is then forced into a receptacle fitted in the bulkhead and is sealed therein by the liberal application of a silicone rubber sealing compound which is intended to wick into the interstices between the bundled cables/conductors so as to provide an effective pressure seal. However, in practice, this type of pressure seal tends to leak, as not all the gaps in the seal are reliably filled by the sealing compound. This problem is accentuated by high-pressure differentials across the seal and by cyclical pressurization and depressurization in normal use.

Another problem with the conventionally used arrangement is that it relies on a sufficient bundle of cables/conductors being passed through the elastomeric bung in order to produce optimum results. When it is desired to pass only a few small cables through a particular bulkhead orifice, the hole through the bung can be too large in comparison to the size of the cable bundle for the sealant, which is quite fluid, to form an effective seal.

SUMMARY OF THE INVENTION

The present invention in its broadest aspect reduce these problems by arranging for the silicone rubber sealing compound to be contained, or at least substantially contained, when it is applied to the passage of the cable/conductor bundle through the bulkhead opening.

More particularly, the inventor has recognized that such containment of the sealing compound can be effected by use of a cable sealing gland which is adapted to be fitted in an opening in a bulkhead and defines a receptacle which is closed by a rupturable wall of resilient elastomeric material which is or can be pierced to allow the passage therethrough of a cable/conductor bundle which will be held together by the elasticity of the pierced wall, thereby minimizing the interstitial spaces between the individual cables/conductors of the bundle and facilitating their effective sealing by means of sealing compound potted into the receptacle.

In a particular embodiment of the invention, which will be described in detail hereinafter, the rupturable wall of the receptacle is defined by a synthetic rubber membrane, e.g., a silicone rubber membrane, which is backed by a support member having a plurality of apertures formed therein to define predetermined locations whereat the membrane may be pierced to allow passage of a cable/conductor bundle therethrough. The apertures in the support member are advantageously of different sizes for accommodating differently sized cable/conductor bundles, and, at the locations whereat the membrane extends over the apertures in the support member, the membrane is advantageously thinned to enhance its capability to conform closely and seal to the often irregular surface profile of a cable/conductor bundle piercing the membrane. The profile of the membrane at the locations whereat it is thinned and the form of the edges of the apertures in the underlying support are advantageously selected to achieve an enhanced seal between the membrane and the piercing cable/conductor bundle.

The receptacle, in the embodiment hereinafter described, comprises a circular cylindrical aluminum alloy housing adapted to be fixed in a bulkhead opening by virtue of the provision of an external jam nut mounting arrangement. The support member comprises an electrical insulator in the form of a circular disc which is adhesively secured into one end of the housing, the disc having the abovementioned plural apertures formed therethrough. The membrane likewise comprises a circular disc which is bonded to the inner surface of the support member. An indicator line is provided around the inner cylindrical wall of the housing at a certain spacing from the surface of the membrane to define an ideal fill level for potting the sealing compound into the receptacle.

In use of the aforementioned embodiment, the cables/conductors which are to be passed through a respective bulkhead opening are arranged into one or more bundles sized to be capable of being passed through one or more of the apertures in the support insulator. The silicone rubber membrane is then pierced where it overlies the respective apertures, and the cable/conductor bundles are threaded through the pierced membrane and through the underlying apertures in the support insulator until the appropriate bundle lengths extend downstream of the gland. The resilience of the silicone rubber membrane constrains the cable/conductor bundles where they pass through the membrane, and forms a tight mechanical seal. Silicone rubber sealing compound is then potted into the receptacle to the depth indicated by the marker line. A second insulator disc, similar to the first, may advantageously be threaded onto the cable/conductor bundles upstream of the gland and pressed down onto the sealing compound in the receptacle for urging the sealing compound into the cable bundle interstices and ensuring a void free seal.

As will readily be appreciated, the present invention enables cables, conductors, cable/conductor bundles and the like to be passed through a bulkhead opening and readily and effectively sealed with respect to the opening so that pressure differentials across the bulkhead can easily be accommodated. The sealing membrane effectively prevents, or at least limits, the weeping of the silicone sealing compound down the cables or through any unused apertures in the support insulator. The presence of the support insulator, and more particularly the presence in the completed cable sealing gland of two spaced-apart support insulators, significantly and advantageously restricts the amount of yawing movement that the cable harness can execute where the cables pass through the gland.

The invention also enables additional wiring to be passed through an existing cable gland. This can be achieved, in accordance with a further aspect of the invention, by passing a tube through the membrane and through one of the apertures in the support insulator just as if it were a cable/conductor bundle, and sealing the tube with a removable bung. The tube thus installed in the cable sealing gland provides a by-pass through the gland which can be opened and utilized for additional wiring or other later modifications to an already installed gland. The tube can be permanently sealed as desired by injection of sealing compound into the tube.

The above and further features of the present invention are set forth with particularity in the appended claims and, together with the advantages thereof, will become clear from consideration of the following detailed description of the abovementioned exemplary embodiment which is given with reference to the accompanying drawings.

BRIEF DESCRIPTION OF THE DRAWINGS

FIGS. 3A to 3F show the membrane that is incorporated into the cable sealing gland of FIG. 1 and 2, all to an enlarged scale, FIG. 3A being a top plan view showing the positions of formations provided in the membrane, FIG. 3B being a side elevation view, FIGS. 3C and 3D being plan and cross-sectional views showing the profile of one of three large pierceable formations that are provided in the membrane, and FIGS. 3E and 3F being plan and cross-sectional views showing the profile of one of two small pierceable formations that are provided in the membrane;

FIG. 5A is a schematic cross-sectional diagram showing the juxtapositioning of a pierceable formation in the membrane with an aperture in the support member prior to piercing of the membrane and insertion of a cable/conductor bundle therethrough, and FIG. 5B shows the arrangement of FIG. 5A after insertion of the cable/conductor bundle.

DETAILED DESCRIPTION

Figure 1:
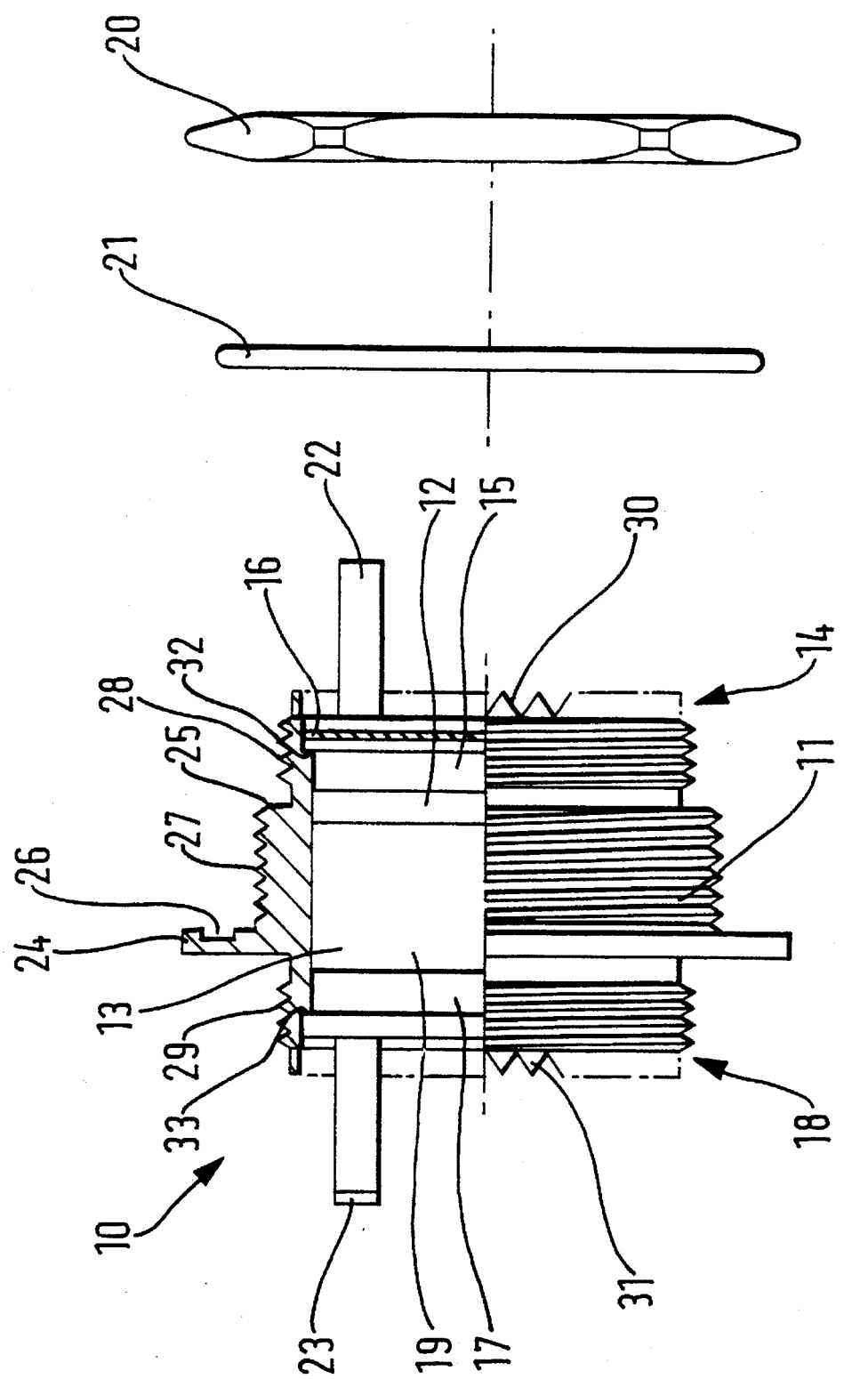
FIG. 1 is a half-sectional side elevation view of a cable sealing gland embodying the present invention.
Figure 2:
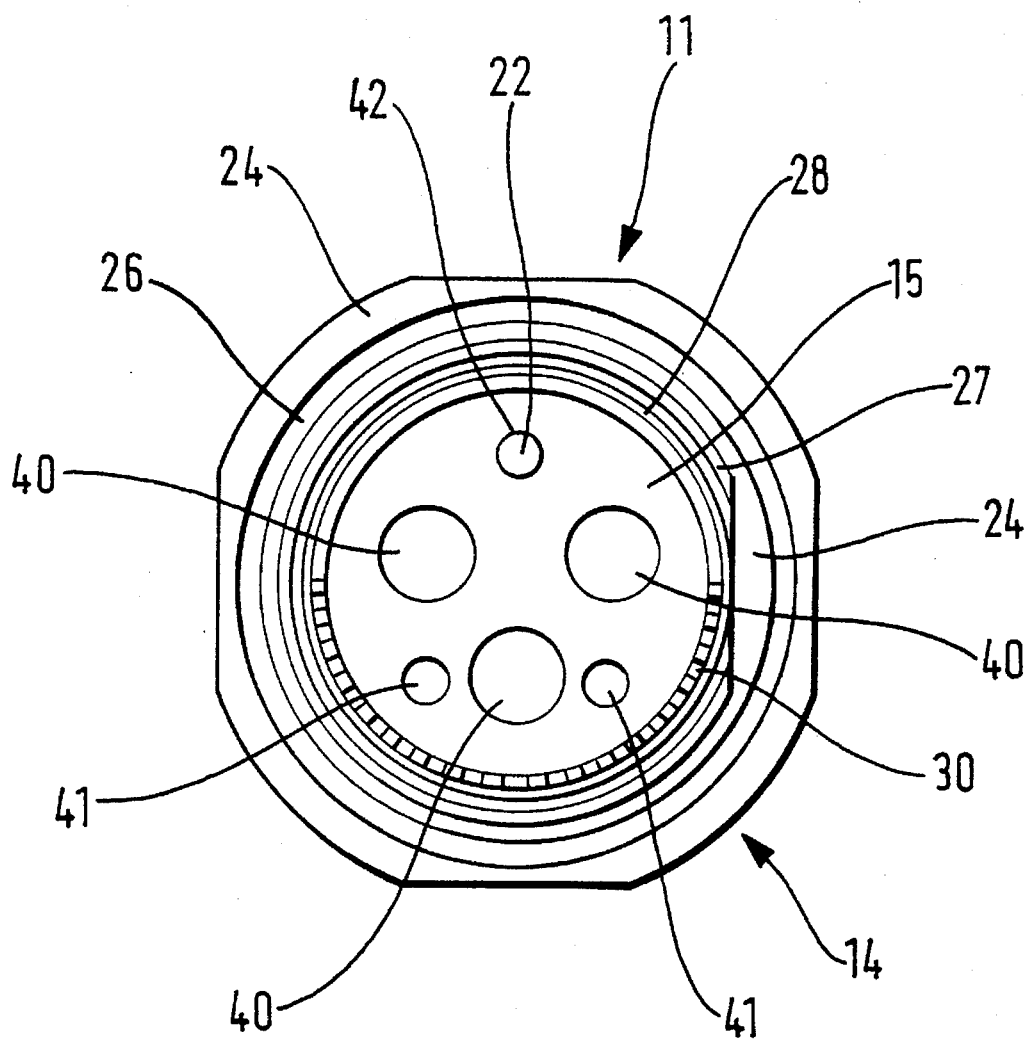
FIG. 2 is an end elevation view of the cable sealing gland of FIG. 1, the view being taken from the right-hand side of FIG. 1 with the jam nut and O-ring seal omitted.

FIGS. 1 and 2 show a cable sealing gland 10 for providing a cable conduit through a bulkhead between two enclosures at different pressures, the gland essentially comprising a housing 11 and a cable sealing membrane 12. The housing 11 has a generally circular-cylindrical internal shape and defines a chamber or receptacle 13 therein. The sealing membrane 12 is adhered at a first end 14 of the chamber 13 to an electrically insulating support member 15 which backs the membrane and is itself adhered to the housing 11 with an O-ring seal 16 sealing the support member/housing interface. The gland 10 further comprises a second insulator 17 which is located at and fits into the second end 18 of the chamber 13. As will be explained hereinafter, the insulators 15 and 17 are apertured and bundles of cables or the like can be passed through the apertures by first piercing the membrane 12 at corresponding locations, the membrane then forming a pressure seal around each bundle and serving to contain a silicone rubber sealing compound or the like introduced into the chamber 13, the sealing compound solidifying to form a resilient plug 19 which seals and supports the passage of the cable/conductor bundles through the cable sealing gland. Furthermore, a by-pass tube 22 together with an associated sealing bung 23 are advantageously provided through the cable sealing gland 10 in order to provide an additional sealable, small cable passageway. The cable/conductor bundles are threaded through a screw-threaded locking cap (not shown) which is adapted to be screwed onto the housing 11 at the second end 18 thereof, and the locking cap serves to retain the second insulator 17. The housing 11 is also provided with an external flange 24 and external screw threads for cooperation with a jam nut 20 and an associated O-ring seal 21 to enable the housing 11 to be secured within an orifice cut in a bulkhead panel.

Referring more closely to FIGS. 1 and 2, it can be seen that the housing 11 has a flange 24 formed between the first and second ends 14, 18 and extending outwards from the external surface 25 of the housing 11. The flange 24 has a groove 26 formed on one side thereof for accommodating the O-ring seal 21, and the external surface of the housing 11 has a screw thread 27 for mounting the jam nut 20. By this means, the housing 11 can be securely mounted in a suitably sized aperture in the bulkhead panel, the external part of the housing 11 being pressure sealed to the bulkhead due to the use of the O-ring seal 21.

At the first and second ends 14, 18, the housing 11 has respective screw threads 28, 29 formed on its external surface 25 this allows various kinds of connector accessories, including the previously mentioned locking cap, to be screwed onto the housing 11. These accessories are adapted to be locked into a fixed rotational position with respect to the housing 11 by virtue of being formed with locking teeth which cooperate with locking teeth 30, 31 provided at the respective first and second ends 14, 18 of the housing. The housing 11 is made of aluminum alloy, and thus the screw threads 27, 28, 29 are easily formed by machining the housing 11. The external surface 25 of the housing 11 and the jam nut 20 can then be finished by plating with a corrosion-resistant metal such as Nickel.

The chamber 13 that is defined within the housing 11 is adapted to locate the first insulating support 15 and the second insulating support 17 in predetermined positions at the respective ends of the housing. To this, end the chamber 13 is formed with stepped internal wall portions 32, 33 against which the respective insulating supports 15 and 17 can be abutted when they are inserted into the chamber 13, the support members themselves being complementarily stepped. Furthermore, the chamber 13 advantageously has a circumferential marking groove (not shown) cut into its inner surface proximate the second end 18, and this is clearly defined by filling the groove with colored ink, for example. The groove is used when filling the chamber 13 with silicone rubber sealing compound to provide a maximum fill level indication.

Figure 3A:
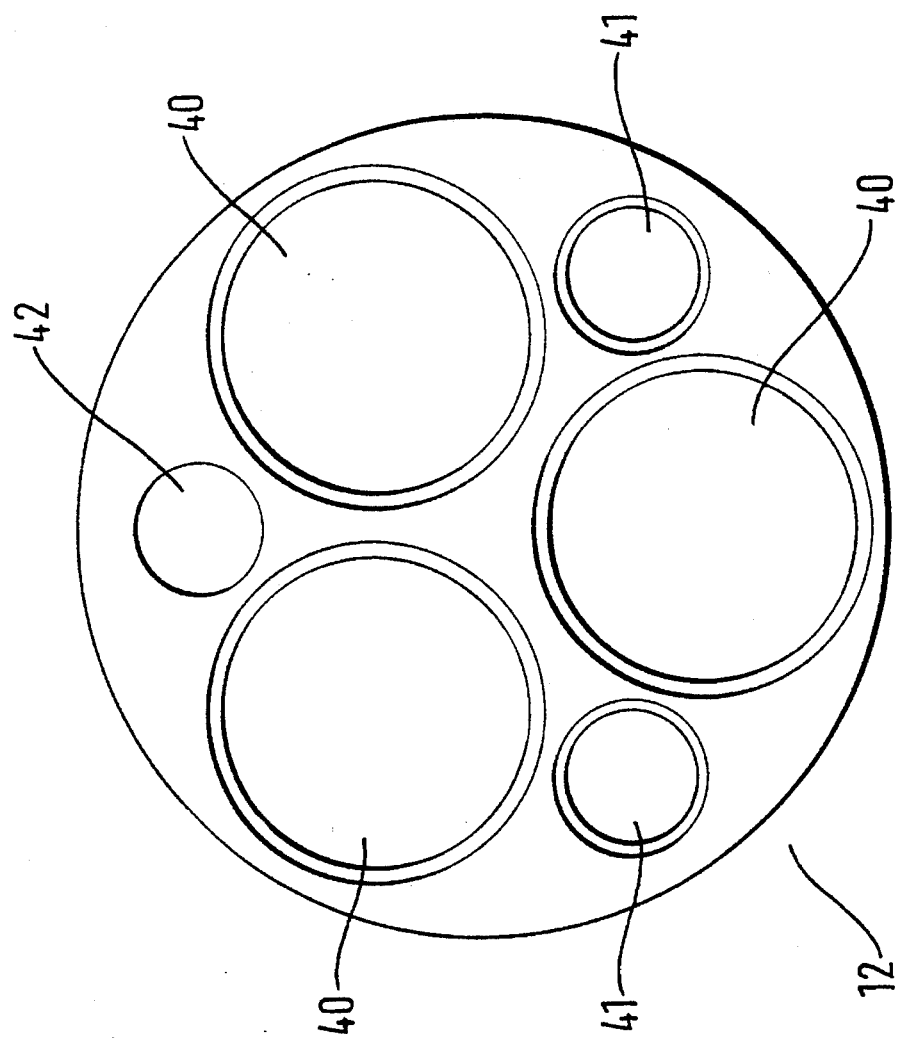
Figure 3B:
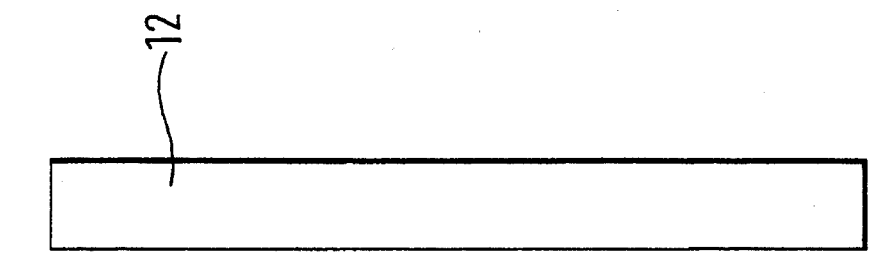
Figure 3F:
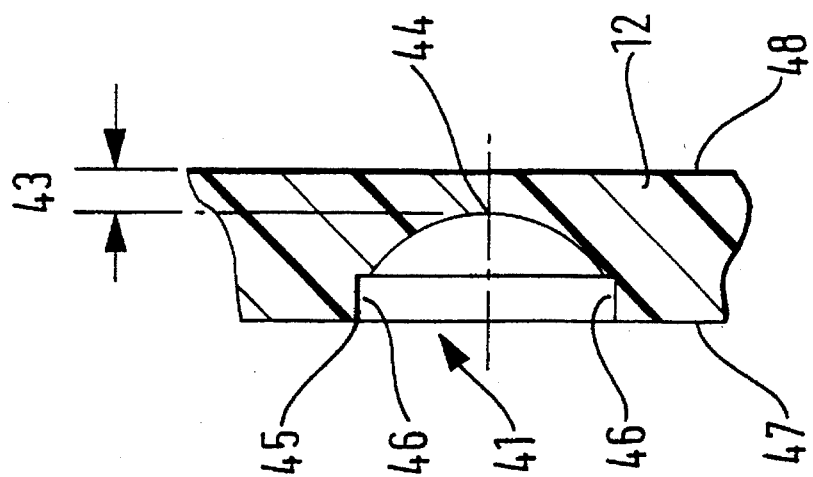
Figure 3E:
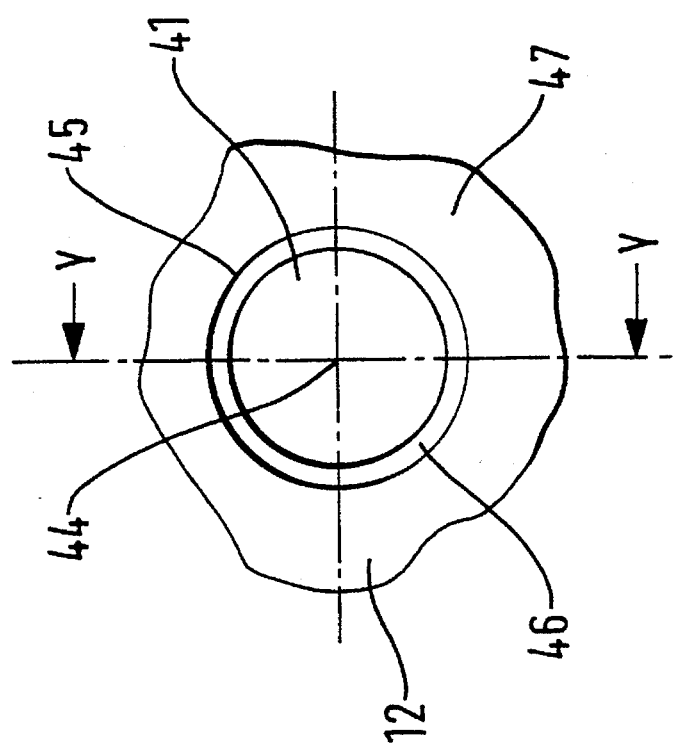

Referring now to FIGS. 3A and 3B, the cable sealing membrane 12 is made from elastomeric silicone rubber and is in the form of a circular disk having a diameter selected such that the membrane makes a close fit within the chamber 13. The membrane 12 is formed with three large pierceable formations 40, two small pierceable formations 41, and a through hole 42 which serves to accommodate the tube 22. As shown in FIGS. 3C, 3D, 3E and 3F, the large and small pierceable formations 40, 41 formed in the membrane 12 are circular and part-spherical, having a generally concave cross-sectional profile through Z—Z and Y—Y, respectively. The radius of curvature of each of the formations 40, 41 is so selected as to leave a predetermined thickness 43 of silicone rubber material at a central piercing point 44. The formations 40, 41 are designed to be pierced at the piercing point 44 to enable the passing of a cable or a cable/conductor bundle through the membrane 12. The passing of a cable/conductor bundle through either of the formations 40, 41 can cause a significant amount of stress at the circumference or rim 45 of the formations 40, 41 and, in order to accommodate this, the formations 40, 41 are formed with a stress-relieving step 46 in their cross-sectional profile at their rim 45.

Figure 4B:
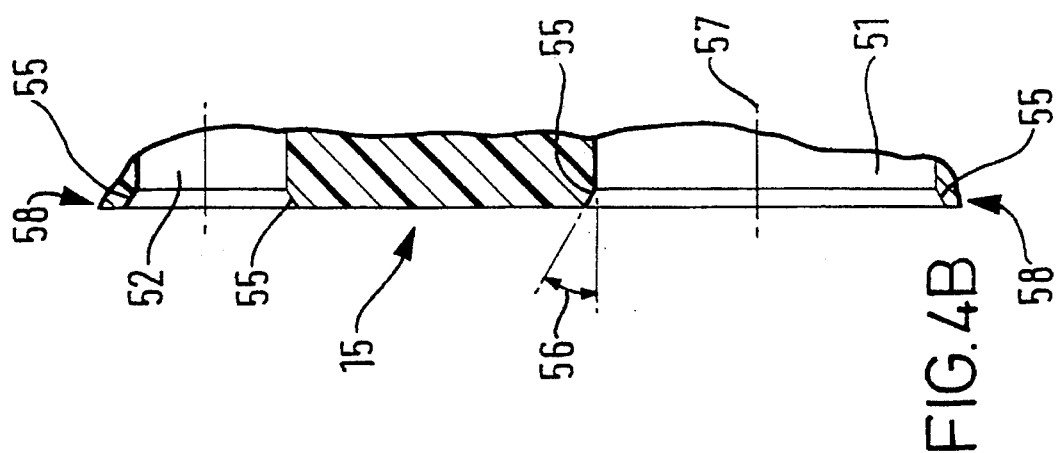
FIGS. 4A and 4B show the support member that backs the membrane in the cable sealing gland of FIGS. 1 and 2, FIG. 4A showing the arrangement of apertures provided through the support member at locations corresponding to the locations of the formations provided in the membrane, and FIG. 4B being a partial sectional view showing chamfering at the edges of the apertures.
Figure 4A:
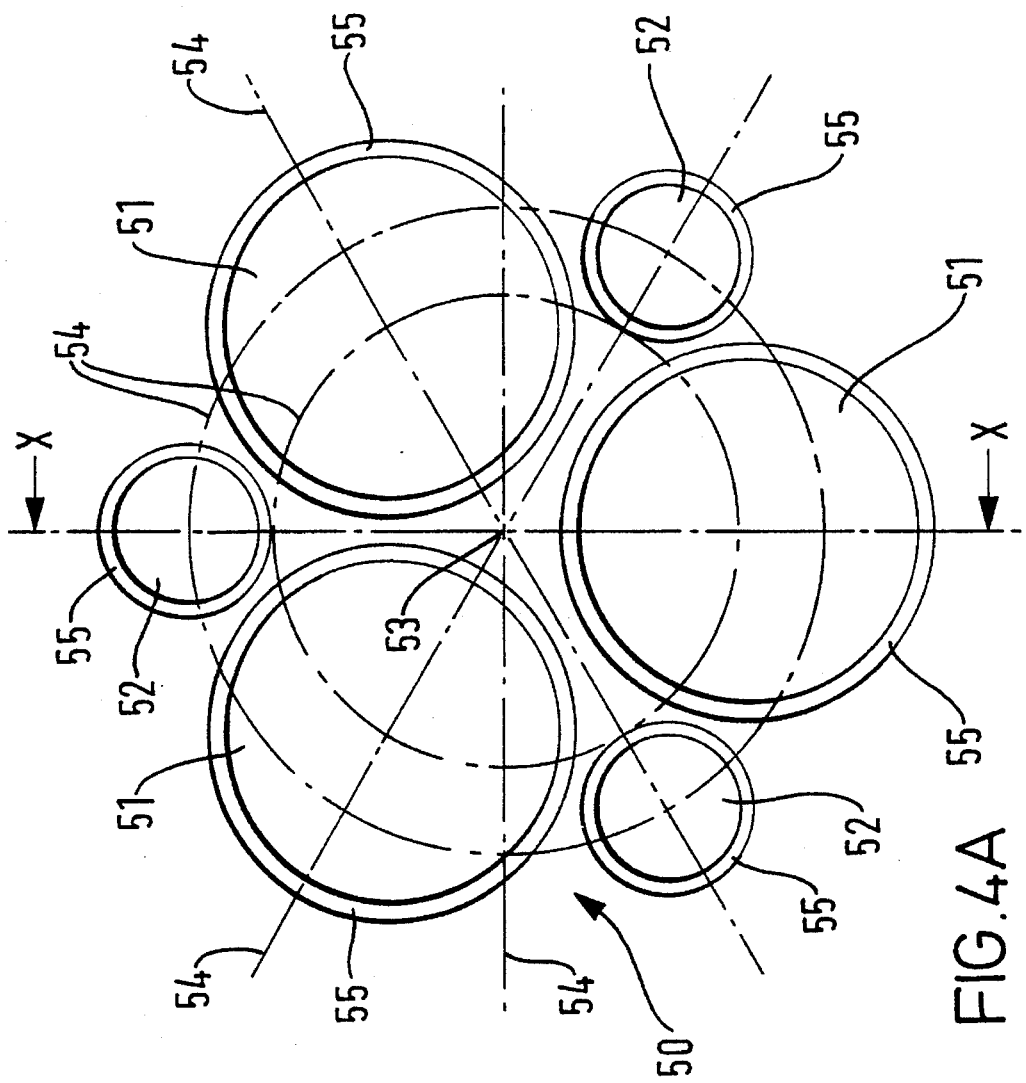

FIGS. 4A and 4B show the arrangement of the through apertures which are formed in the support insulators 15 and 17. The arrangement 50 comprises three large circular apertures 51 and three smaller circular apertures 52 disposed symmetrically about a center 53, this arrangement being designed to match the arrangement of the pierceable large and small formations 40, 41 and the through hole 42 that are provided in the cable sealing membrane 12. Thus, when the membrane 12 is adhered to the insulating support 15 in the correct orientation, the formations in the membrane 12 align with respective ones of the apertures in the support member 15.

The members 15 and 17 are formed of a rigid electrically-insulating plastic material and desirably, though not essentially, are identical. Each of the members 15, 17 comprises a disc-shaped body which incorporates a step formation about its circumference, as shown in FIG. 1, so as to enable the respective body to be located within the chamber 13 in abutment with respective ones of the stepped portions 32, 30 of the internal chamber wall, and thus in predetermined positions. At least the membrane support insulator 15 also has tapered surfaces 55 formed at the ends 58 of the apertures 51, 52 which are proximate to the membrane 12. This feature is clearly illustrated in FIG. 4B, which is a cross-sectional view through a fragmentary part of the support insulator 15. The tapered surfaced 55 is inclined at an angle 56 to the axis 57 of the respective aperture 51, 52, and this angle 56 is typically 25°. The tapered surfaces 55 enhance the sealing effect of the membrane 12, as is discussed in detail later. In addition, the opposed ends 59 (see FIGS. 5A and 5B) of the apertures 51, 52 comprise further chamfered surfaces 60 which are provided for reducing the likelihood that the cables passing through the apertures 51, 52 will be cut on the edges of the apertures 51, 52 due to cable movement. Various other sharp edge-removing profiles could be used in place of the chamfered surfaces 60, and these could be just as effective. The second insulating body 17, if it is not identical to support insulator 15, need have chamfered surfaces only at the outer end of its apertures in order to prevent cables from being cut, and there is no need to form tapers at the opposed, inner ends of the apertures where the cables will be securely held by the silicone rubber sealing compound.

As previously described, the insulating body 17 is secured in its predetermined position in the housing 11 by means of a locking cap (not shown), which can be screwed onto the second end 18 of the housing 11. The locking cap may advantageously incorporate a cable tie for securing together cables that are fed into the cable sealing gland 10 and for providing strain relief for the cable sealing gland. The cable tie/end cap arrangement advantageously has a toothed rim at an assembly connection end which, when engaged with the set of locking teeth 31 provided on the housing 11, locks the cable tie into a predetermined position against rotational movement. This ensures that any subsequent pulling on the cables does not cause any substantial strain on the internal components of the cable sealing gland,: rather, any such strain acts directly on the housing 11, which is constructed to withstand it.

The provision of the by-pass tube 22 through the cable sealing gland 10 provides a further advantage over prior art arrangements. In the prior art, once the cable gland has been sealed, further access through the gland cannot be obtained. The advantage of using the by-pass tube 22 and its sealing bung 23 is that it provides a passageway within an already sealed assembly for subsequent through access. The by-pass tube 22 is made of a plastic material and is dimensioned to pass sealingly through the hole 42 that is formed in the sealing membrane 12 and to be secured in place by the silicone rubber sealing compound when it sets. The bung 23 is made from PTFE, for example, and is dimensioned to fit into one end of the tube 22 and to form a pressure seal therewith.

FIGS. 5A and 5B illustrate the use of a cable sealing gland as described herein above. FIG. 5A shows one aperture 59 in the membrane support insulator 15 and the adjoining region of the membrane 12 prior to piercing of the formation 40, 41 and passage of a cable/conductor bundle therethrough, and FIG. 5B shows the situation after the membrane 12 has been pierced and the cable/conductor bundle inserted. As can be seen from FIG. 5B, when a cable or bundle of cables 61 are fed through the pierced membrane, the elastomeric material of the membrane is stretched to accommodate the cable, and portions of the membrane are drawn down into the aperture in the support insulator and are in effect wedged therein between the aperture wall and the cable surface so as to form a pressure seal, which is secured and reinforced by the subsequent injection of sealing compound into the gland.

Figure 6:
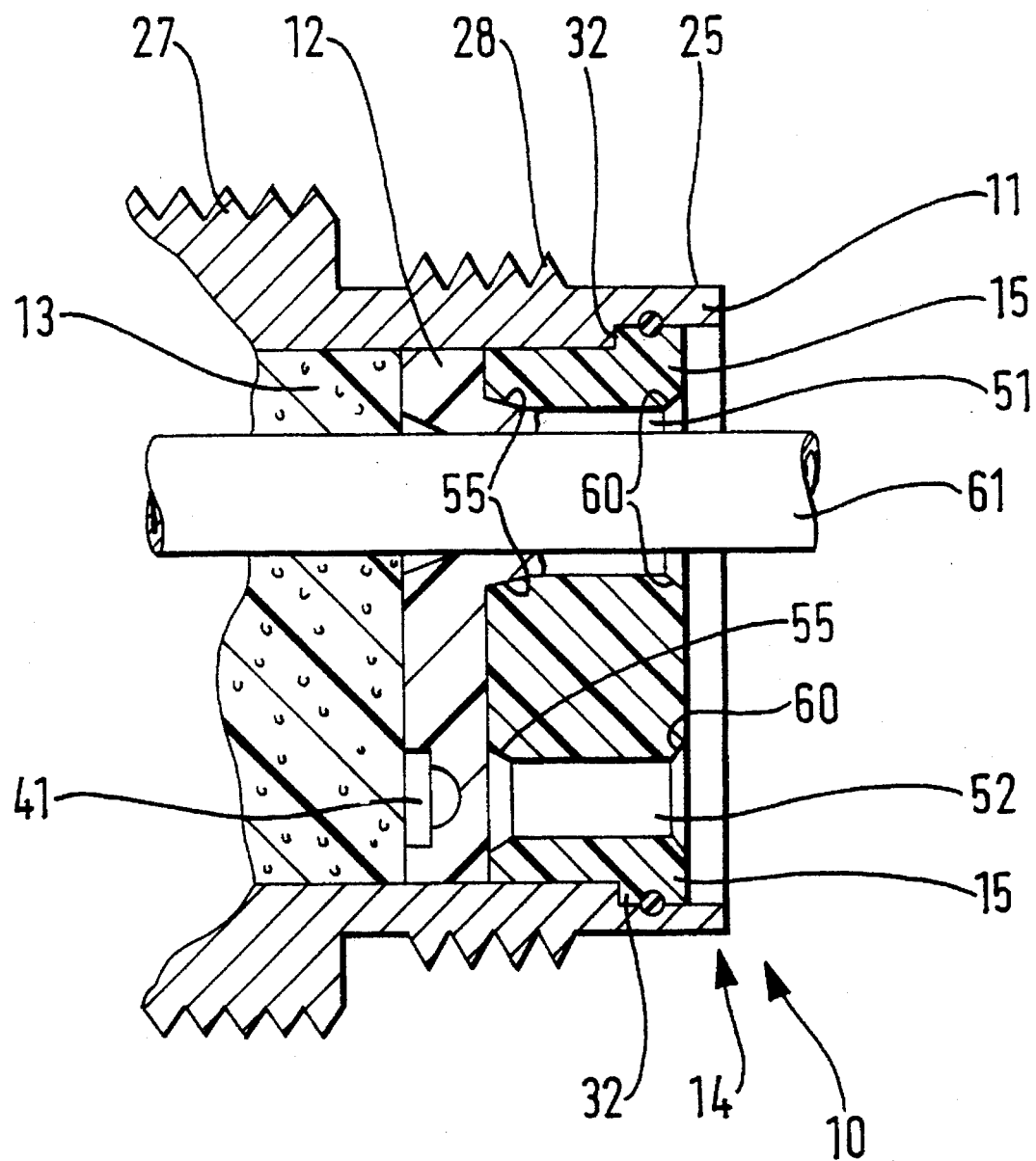
FIG. 6 is a cross-sectional view through an assembled cable sealing gland showing a cable passing therethrough.

FIG. 6 shows a cross-section through the cable sealing gland 10 where a cable 61 has been passed through one of the large pierceable formations 40 of the membrane 12 and one of the large apertures 51 of the support member 15. In this illustration, the small formation 41 in the membrane 12 has not been pierced and thus still forms a seal for the small aperture 52 in the support member 15. After the cable 61 is passed through the gland, it may be sealed in place by filling the chamber 13 with a suitable sealing composition, the filling of the chamber being effected to the level indicated by the previously mentioned fill line that is provided within the chamber. Before the sealing compound sets, the second insulator body 17 is moved into the second end 18 of the housing 11 and, by screwing the locking cap onto the housing, the body 17 is urged into the chamber 13 until it abuts the stepped portion 33. This action causes some of the sealing compound to be squeezed out of the gaps between the cables 61 and their respective apertures and also through unused apertures in the end body 17. More importantly, this action compresses the fluid sealing compound towards the membrane 12 this ensures that cable bundle interstices are well filled and that any air pockets which may have been formed during the potting procedure are forced out. Even if some of the apertures in the end body 17 do not have cables passing therethrough, enough of a force is generated towards the membrane 12 to ensure that the sealing compound fills all voids. The sealing compound is then allowed to set with the cables secured to the cable tie of the locking cap. The thus formed cable sealing gland 10 is then fitted into an orifice in a bulkhead panel, the diameter of the orifice being made to correspond to that of housing 11 at the screw-threaded 27, and is secured in position by screwing the jam nut 20 onto the housing 11. By providing the O-ring seal 21 located in the groove 26 of the flange 24, a pressure seal is formed between the bulkhead and the cable sealing gland.

The membrane 12 and the support insulator 15 may be replaced by a single member which has an arrangement of rigid portions and pierceable flexible portions, the flexible portions being constrained against the rigid portions when a cable is passed therethrough to form a seal around the cable. Similarly, the membrane 12 does not have to have pierceable formations within it and could alternatively be of uniform thickness throughout. Furthermore, the membrane could be pre-pierced at the locations thereof which correspond to the location of the apertures in the support member, or at least partly pre-pierced.

I claim:

1. A cable sealing gland for use in sealing the passage of one or more electrical cables/conductors through a bulkhead, said cable sealing gland comprising:

(a) a tubular housing having an interior;

(b) means for securing said housing sealingly relative to an opening in a bulkhead such that an interior of the housing is in registry with the bulkhead opening, whereby at least one electrical cable/conductor passed through said tubular housing will pass through the bulkhead;

(c) said housing interior defining a receptacle for receiving a fluid cable sealing compound, said receptacle when filled with said compound and with said at least one electrical cable/conductor passing through said tubular housing ensuring that the passage of said at least one electrical cable/conductor through the bulkhead is sealed; and (d) retaining means for said fluid cable sealing compound, said retaining means comprising at least one wall of resilient elastomeric material extending across the interior of said tubular housing so as substantially to seal the same against leakage of said fluid cable sealing compound, said wall enabling electrical cables/conductors of different sizes to be pierced therethrough and elastically engaging said cables/conductors in a manner substantially to seal said cables/conductors against leakage of said fluid cable sealing compound substantially irrespective of the sizes of said cables/conductors.

2. A cable sealing gland as claimed in claim 1, wherein the wall of resilient elastomeric material comprises a membrane of elastomeric material backed by a support member, said support member having means defining at least one aperture therein providing locations for passage of said at least one electrical cable/conductor.

3. A cable sealing gland as claimed in claim 2, wherein the support member has means defining a plurality of apertures of different sizes.

4. A cable sealing gland as claimed in claim 2 or 3, wherein the membrane of elastomeric material is thinned at location(s) thereof which correspond to positions of said means defining said at least one aperture in the support member.

5. A cable sealing gland as claimed in claim 4, wherein the thinning of the membrane is effected by provision of one or more concave formations at said locations of the membrane.

6. A cable sealing gland as claimed in claim 2, wherein the membrane is formed of a silicone rubber material and the support member comprises a rigid plastic material.

7. A cable sealing gland as claimed in claim 2, wherein the tubular housing has a first end and a second end opposed to said first end, and wherein the wall is provided adjacent said first end of the tubular housing and a further support member is provided in the housing adjacent said second end, a spacing between said support members defining a chamber within the tubular housing which is adapted to be filled with said sealing compound.

8. A cable sealing gland as claimed in claim 7, wherein the support member which backs the membrane is fixedly secured in the housing and said further support member is not fixedly secured in the housing.

9. A cable sealing gland as claimed in claim 7 or 8, wherein a fill indicator is provided in the chamber for indicating an appropriate filling level for said sealing compound.

10. A cable sealing gland as claimed in claim 7 or 8, wherein including an end cap adapted to be fitted to said second end of the tubular housing for retaining said further support member therein.

11. A cable sealing gland as claimed in any one of claims 1 to 3 or 6 to 8, wherein a by-pass tube extends through the tubular housing for enabling access to be effected through the cable sealing gland after filling of the receptacle with said sealing compound.

12. A cable sealing gland for use in sealing the passage of at least one electrical cable/conductor through a bulkhead, said cable sealing gland comprising:

(a) a tubular housing having an interior;

(b) means for securing said housing sealingly relative to an opening in a bulkhead such that the interior of the housing is in registry with the bulkhead opening, whereby at least one electrical cable/conductor passed through said tubular housing will pass through the bulkhead;

(c) said housing interior defining a receptacle for receiving a fluid cable sealing compound, said receptacle when filled with said compound and with said at least one electrical cable/conductor passing through said tubular housing ensuring that the passage of said at least one electrical cable/conductor through the bulkhead is sealed; and (d) retaining means for said fluid cable sealing compound, said retaining means comprising at least one wall of resilient elastomeric material extending across the interior of said tubular housing, said wall having at least one flexible portion therein, said at least one flexible portion enabling said at least one electrical cable/conductor to be pierced therethrough and elastically engaging said at least one cable/conductor in a manner substantially to seal said at least one cable/conductor (the same) against leakage of said fluid cable sealing compound.

13. A cable sealing gland as claimed in claim 12, wherein the wall of resilient elastomeric material comprises a membrane of elastomeric material backed by a support member, said support member having means defining at least one aperture therein which provides locations for passage of said at least one electrical cable/conductor.

14. A cable sealing gland as claimed in claim 13, wherein said means defining said at least one aperture comprises at least one tapered surface, and portions of said membrane can be drawn against said tapered surface in use.

15. A cable sealing gland as claimed in claim 14, wherein the membrane portions are wedged between said at least one tapered surface and said at least one cable/conductor so as to form a pressure seal.

16. A cable sealing gland as claimed in claim 3 or claim 12, wherein the wall of resilient elastomeric material is continuous and has at least one thinned portion, said at least one electrical cable/conductor being pierceable through said at least one thinned portion.

17. A cable sealing gland as claimed in claim 3 or claim 12, wherein the wall of resilient material comprises at least one pre-pierced portion and said at least one pre-pierced portion is arranged to be ruptured by passage of said at least one electrical cable/conductor therethrough.

* * * * *